United States Patent [19]
Harris

[11] Patent Number: 4,944,552
[45] Date of Patent: Jul. 31, 1990

[54] STOWABLE TABLE SYSTEM

[75] Inventor: David S. Harris, Denton, Tex.

[73] Assignee: Weber Aircraft, Inc., Burbank, Calif.

[21] Appl. No.: 324,617

[22] Filed: Mar. 17, 1989

[51] Int. Cl.5 .............................................. A47C 7/70
[52] U.S. Cl. ..................................... 297/145; 297/162
[58] Field of Search ...................... 297/195, 162, 155

[56] References Cited

U.S. PATENT DOCUMENTS

| | | | |
|---|---|---|---|
| 451,058 | 4/1891 | Koeser | 297/155 |
| 1,217,231 | 2/1917 | Soper | 297/145 |
| 1,869,444 | 8/1932 | Tobey | 297/145 |
| 2,947,348 | 8/1960 | Peckham | 297/145 |
| 3,371,956 | 3/1968 | Jordan et al. | 297/162 |
| 3,467,432 | 9/1969 | Sullivan | 297/162 |
| 3,547,488 | 12/1970 | Barnes | 297/162 |
| 3,583,760 | 6/1971 | McGregor | 297/145 |
| 3,652,161 | 1/1972 | Arfaras et al. | 297/145 |
| 4,203,624 | 5/1980 | Hopkins | 297/162 |
| 4,575,149 | 3/1986 | Forestal et al. | 297/145 |
| 4,852,940 | 8/1989 | Kanigowski | 297/155 |

Primary Examiner—Peter R. Brown
Attorney, Agent, or Firm—Lyon & Lyon

[57] ABSTRACT

A stowable table system for use with a compartment in a vehicle seat, or the like, comprises a pivot block mounted for pivotal movement with respect to the compartment and a pivot stud mounted for pivotal movement in the pivot block and, in turn, mounting a table base that attaches a table structure for pivotal movement with respect to the pivot stud. A first set of shoulder forming limit stops enables the table structure, when in its use position, to be angularly displaced to a predetermined extent and a second set of shoulders prevents angular displacement between the table base and the compartment when the table structure is disposed in a position preparatory to stowing it in the compartment.

15 Claims, 5 Drawing Sheets

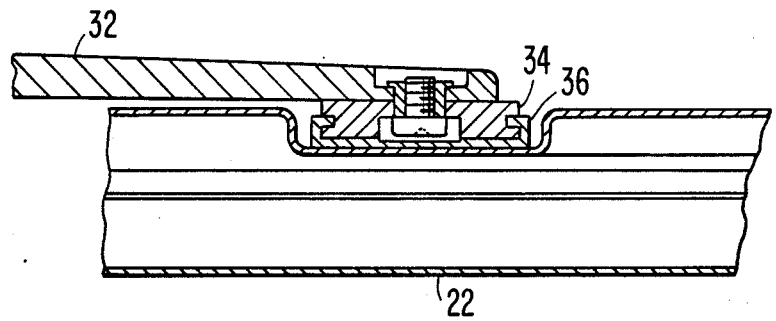
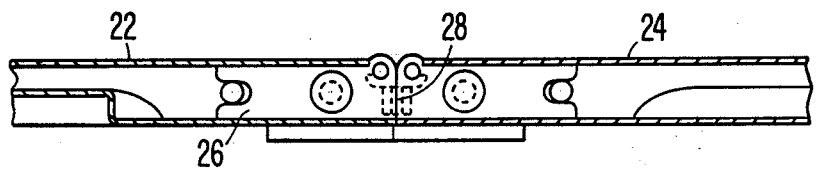
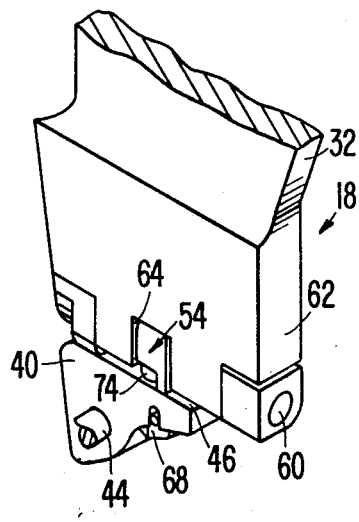
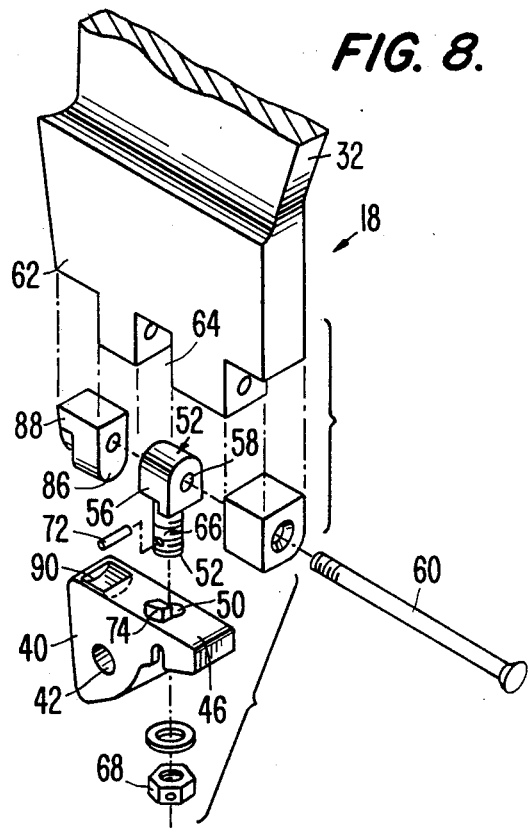

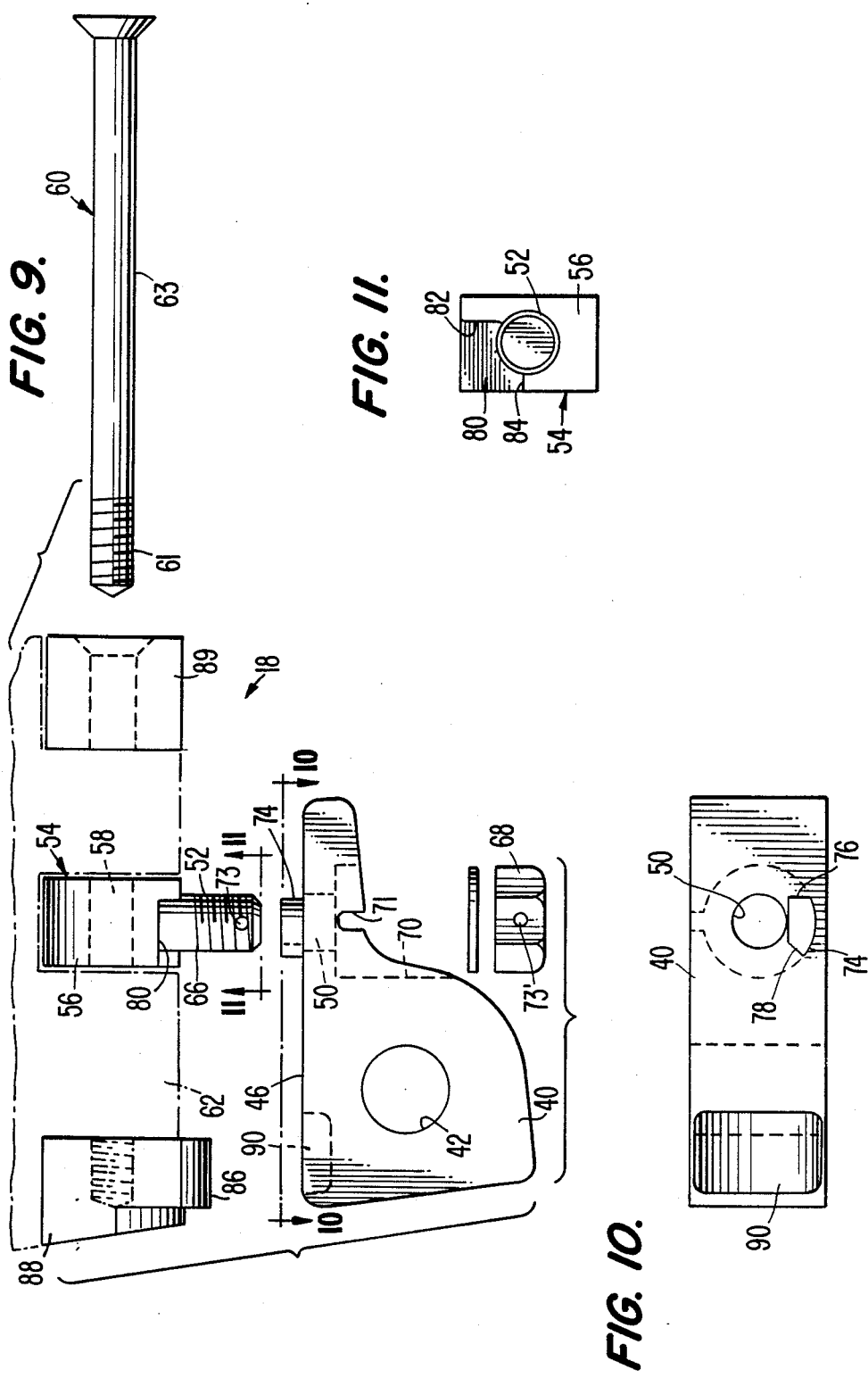

STOWABLE TABLE SYSTEM

BACKGROUND OF THE INVENTION

The present invention relates to stowable tables of the type commonly employed in vehicles, such as commercial aircraft. More particularly, the invention involves an improved, simplified support system that advantageously permits a stowable table structure, when in its horizontally disposed position of use, to be angularly displaced to a degree sufficient to permit the user to leave the seat obstructed by the table.

Table systems of the described type that are stowable in a compartment contained in the armrest of a seat, or the like, normally provide for pivotal movement about two mutually perpendicular axes whereby the table structure can be first, removed from its stowed position in the compartment and, thereafter, pivoted downwardly from an elevated vertical disposition into a horizontal position of use. Such table systems for vehicle application typically contain no provision for angular displacement of the table structure in its use position such that a user, in order to leave the seat, must return the table structure essentially to its stowed position.

Those stowable table systems that do have provision for angular displacement of the table structure, when horizontally disposed, require complex hinge mechanism or, alternatively, limit stops formed integrally with the armrest or escutcheon whereby, not only is the cost of such systems increased, but retrofitting into existing vehicular seating without replacement of the armrest escutcheon is prevented.

It is to the amelioration of these problems, therefore, to which the present invention is directed.

SUMMARY OF THE INVENTION

According to the present invention there is provided a stowable table system adapted for use in a vehicle seat, or the like, including means forming a compartment in the seat for stowing a table structure; a pivot block mounted for pivotal movement in the compartment; a table base securing the table structure; means for attaching the table base for pivotal movement with respect to the pivot block comprising a pivot axle extending from the table base and journalled for pivotal movement in the pivot block; and mutually cooperable shoulder means on the pivot block and the table base for limiting the angular displacement of the table base with respect to the pivot block.

A pivot stud that mounts the table base for pivotal movement is, itself, pivotally journalled in the pivot block. The shoulder means that define the limits of angular displacement of the table structure are formed on the pivot block and pivot stud, respectively, whereby the need to specially provide the armrest escutcheon with such shoulders is eliminated. The elimination of the need for an escutcheon of special structural configuration not only reduces the cost of such a system, but, conveniently enables the retrofitting of existing seat compartments for utilization of the described table system.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 4 a sectional view taken along line 4—4 of FIG. 2;

FIG. 5 is a view, partly in section, taken along line 5—5 of FIG. 2;

FIG. 7 is a partial perspective view of the assembled hinge mechanism of the present invention;

FIG. 8 is a partial exploded perspective view of the hinge mechanism of the present invention;

FIG. 9 is a partial exploded elevational view of the hinge mechanism of the present invention;

FIG. 10 is a top plan view of the pivot block element of the hinge mechanism taken along line 10—10 of FIG. 9;

FIG. 11 is a bottom plan view of the pivot stud element of the hinge mechanism taken along line 11—11 of FIG. 9.

DESCRIPTION OF THE PREFERRED EMBODIMENT

Figure 1:
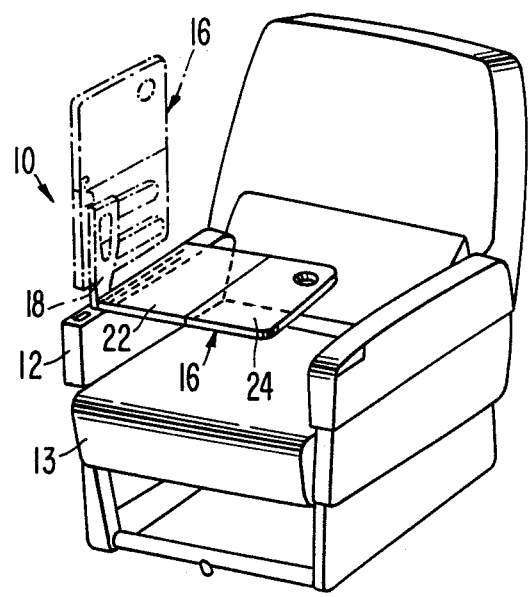
FIG. 1 is a perspective representation of a vehicle seat most typically of the aircraft-type, equipped with table structure according to the present invention.
Figure 6:
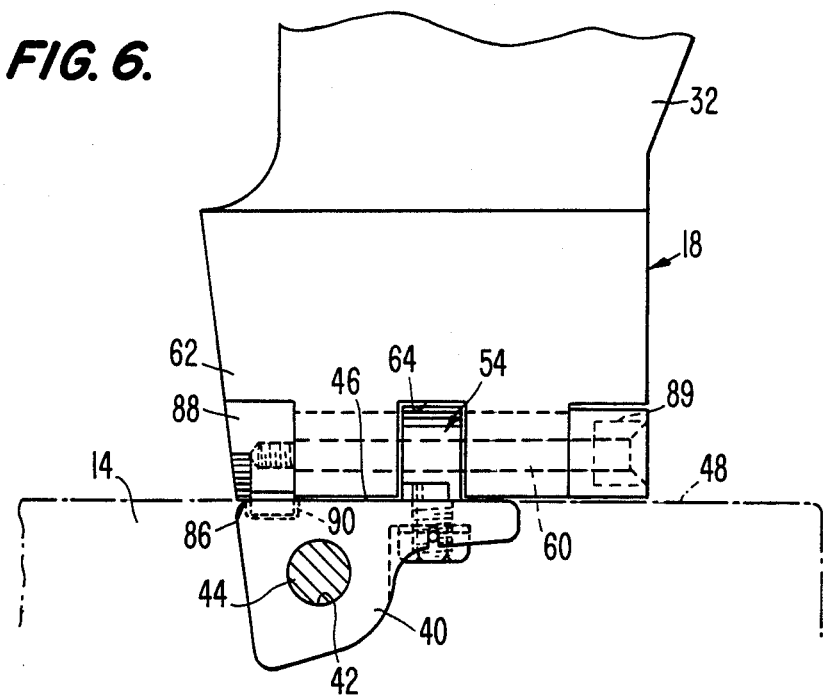
FIG. 6 is an enlarged partial view of the hinge mechanism of the present invention.
Figure 2:
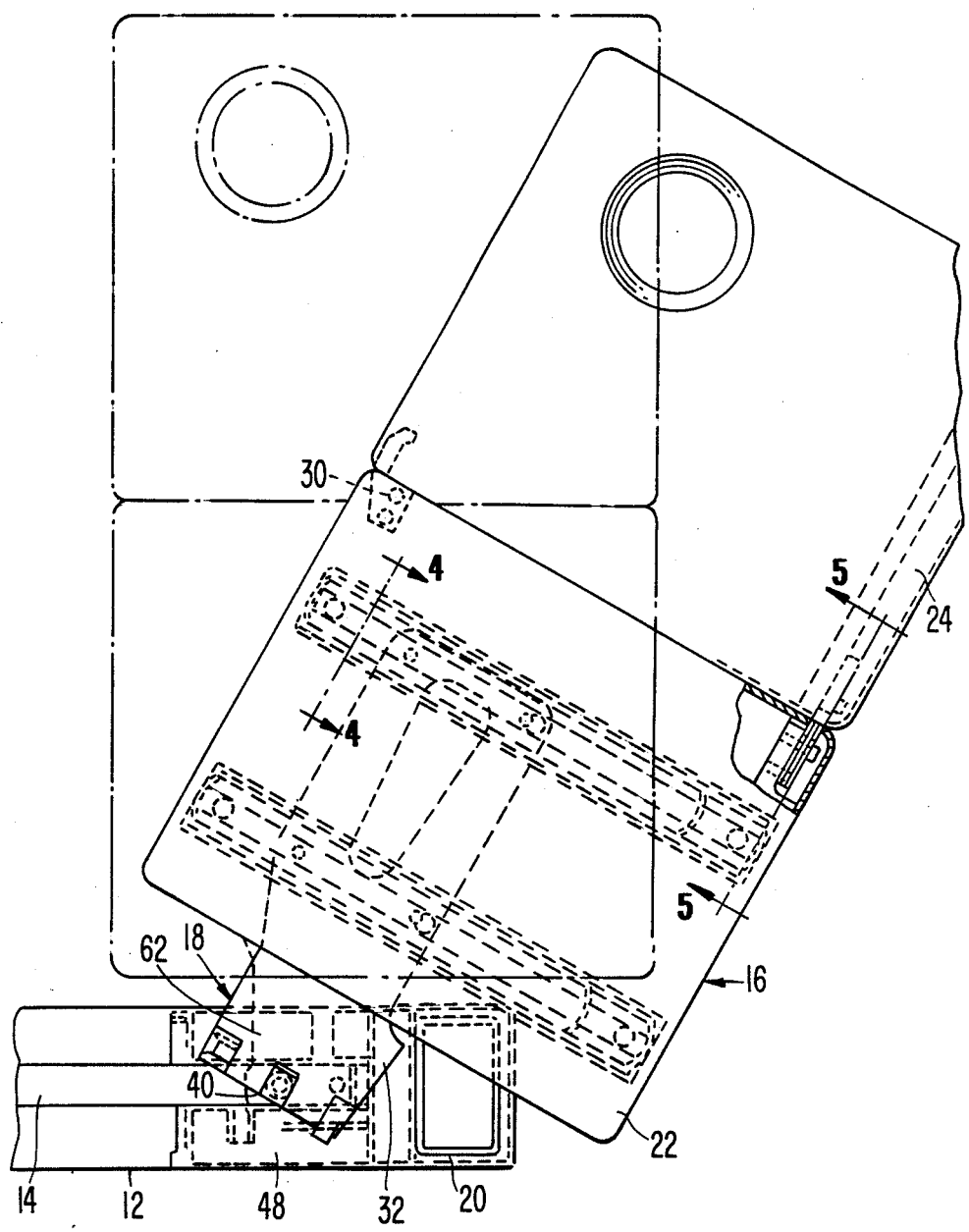
FIG. 2 is a top plan view, partly in section, illustrating the table structure of the invention in its use and displaced positions.

Referring now to the drawing figures, there is shown a stowable table system 10 adapted for stowed retention in the armrest 12 of a vehicle seat 13, as most commonly utilized in commercial aircraft. As shown, the armrest 12 includes an interior space 14 of a size sufficient to store the table system 10 that includes a foldable table structure 16 and a hinge organization 18 according to the present invention, the latter being adapted for pivotal mounting to an escutcheon 20 which forms part of the armrest 12.

The table structure 16 is essentially of known construction comprising a pair of table sections 22, 24 connected along their adjacent longitudinal edges by a hinge assembly 26. The hinge assembly 26 mounts the respective table sections 22, 24 such that, in their unfolded disposition the distal section 24 derives structural support from the bearing engagement that occurs between the oppositely facing side surfaces 28 of these sections. A finger lift member 30 attached to the table section 22 may also serve to provide horizontal support for the extended table section 24.

Figure 3:
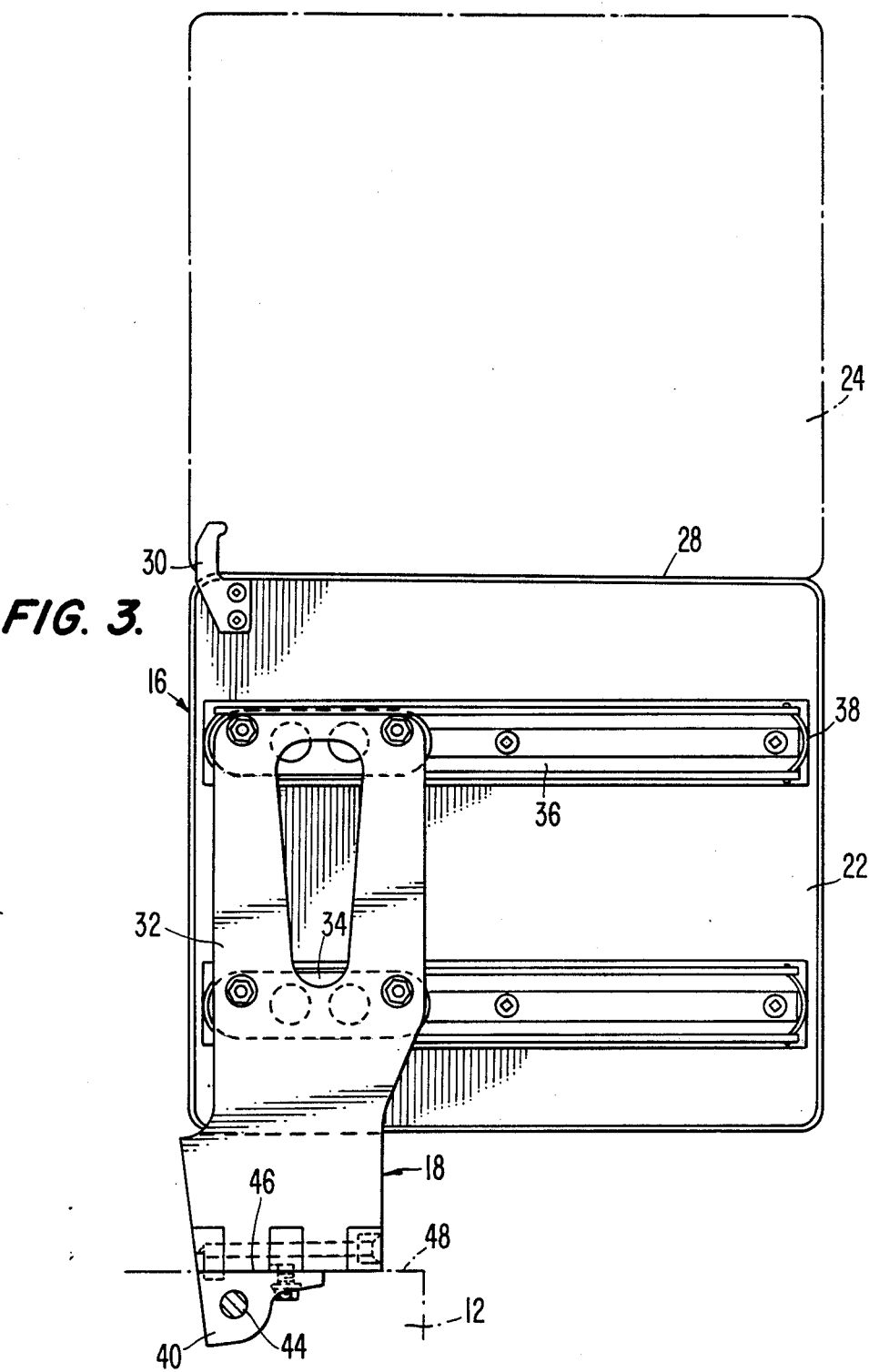
FIG. 3 is an elevational view of the table structure of the invention in an intermediate position between its stowed and use positions.

As is well known in table systems of the described type, to effect fore-and-aft positional adjustment of the table with the user, the disclosed system includes an arm assembly 32 having fixedly secured thereto a pair of longitudinally spaced slide bars 34 adapted for sliding reception each in one of a pair of guide tracks 36. As shown in FIG. 3, the guide tracks 36 are fixedly spaced on the undersurface of the table section 22, parallel to the longitudinal edges thereof. Opposite ends of the respective tracks 36 contain appropriate limit stops 38 to restrict the extent of movement of the table sections 22, 24 with respect to the arm assembly 32.

The hinge organization 18 comprises a pivot block 40 containing a through-hole 42 for receiving a pivot bolt 44 to rotatably mount the pivot block on the escutcheon 20. The pivot block is provided with a support surface 46 which is adapted to align with the upper surfaces 48 of the escutcheon 20 when the pivot block is disposed to locate the table system exteriorly of the armrest 12. A transverse bore 50 extends through the pivot block 40, opening at one end on the support surface 46. The bore 50 receives the shank 52 of a pivot stud 54, the upper end of which contains a head 56 having a transverse opening 58 for reception of a pivot pin 60 enabling attachment of the stud to the pivot end 62 of the arm assembly 32, the latter being recessed at 64 for reception of the stud head 56. The pivot pin 60 contains screw threads 61 at one end for mating connection to threads in the arm assembly 32 and a shank 63 that enables pivotal movement between the arm assembly and the pivot stud 54.

Threads 66 on the shank 52 of the pivot stud 54 enable the reception of a nut 68, that is received in the counterbore 70 in the bore 50, thereby securing the pivot stud for limited rotational movement with respect to the pivot block. In order to securely fix the nut 68 to the shank 52, provision is made for an anchor pin 72 that is force fit into accommodating openings 73 and 73' in both the shank and the nut, respectively. A notched recess 71, that intersects the counterbore 70 in the pivot block 40, provides access for installation and removal of the pin 72.

The support surface 46 adjacent the bore 50 is provided with an upstanding boss 74 having angularly spaced stop surfaces 76 and 78. Surface 76 extends substantially parallel to the ends of the support surface 46 in slightly longitudinally offset relation to the bore axis. Surface 78, on the other hand, is disposed in angularly spaced relation with respect to the surface 76 and the bore axis making an included angle of about 40° with respect to the latter.

The undersurface of the stud head 56 is provided with an undercut portion 80 that is so formed as to define angularly spaced shoulders 82 and 84 which cooperate with the stop surfaces 76 and 78 on the boss 74 for determining the extent of angular movement of the arm assembly 32 with respect to the pivot block 44 and, concomitantly, the extent of angular movement to be undergone by the table structure 16 when in its horizontally oriented, use position. As shown in FIG. 11, the shoulder 82 extends parallel to the side surfaces of the stud head 56 and is offset from the axis of the shank 52 by an amount substantially coincident with the offset spacing of the surface 76 from the axis of the bore 50. Shoulder 84, on the other hand, is angularly spaced from shoulder 82 by an amount that permits relative pivotal movement of about 45° between the stud shank 52 and bore 50. By so configuring the boss 74 and the undercut portion 80, it will be appreciated that the latter is adapted for superimposed disposition upon the former whereby the sides of the pivot stud head 56 are received in parallel disposition with the facing sides of the recess 64 in the pivot end 62 of the arm assembly 32 such that any angular movement of the table structure 16 will be controllably guided by movement of the pivot stud 54 within the bore 50 of the pivot block 40 and that, by means of the cooperation between the stop surfaces 76, 78 and shoulders 82, 84, a horizontal angular displacement of the table of about 45° is permitted.

The described structure is advantageously provided with a limit boss 86 that may be integrally formed on the arm assembly 32, but is here shown as being formed in the filler member 88 for insertion in an accommodating recess 90 in the arm assembly pivot end 62 to accomplish alternative retrofit installation of the invention. A threaded bore in the filler member 88 receives the threaded end of pivot pin 60. A similar filler member 89 may be provided to accommodate various pin head configurations for retrofit purposes. Obviously, where a retrofit installation is not required, the filler members 88 and 89 can be formed as integral portions of the arm assembly 18.

As shown, the boss 86 is arranged to extend from the pivot end 62 of the arm 32 and is adapted for reception in a well recess 90 formed on the support surface 46 of the pivot block 40. The configuration and disposition of the boss 86 and well recess 90 are such that the boss 86 will be received in the recess only when the pivot end arm of the assembly 32 is aligned in parallel with the support surface 46 and the arm assembly 32 is vertically disposed. By means of this arrangement, any relative pivotal movement between the table structure 16 and the pivot block 40 during return of the table structure to the armrest interior is prevented.

In operation, therefore, with the table structure 16 folded and stowed in the interior of the armrest 12, lifting the structure via the finger lift 30 effects rotation of the pivot block 40 with respect to the escutcheon 20 thereby withdrawing the table structure from the armrest interior to a vertical disposition above the armrest. The arm assembly 32 is then rotated about the pivot axle formed by the screw 60 such that the arm assembly is supportedly disposed on the upper surface of the escutcheon 20. Thereafter, the table section 24 is rotated via hinge 26 into its extended position and the table is ready for use.

In order to angularly displace the extended table, as, for example, is required for the user to leave the seat, the user need only push the table structure 16 whereupon it will pivot about the axis defined by the disposition of the pivot stud shank 52 in the bore 50 of the pivot block 40. Such pivotal movement extends from a first table position in which the shoulder 82 on the pivot stud 54 engages the stop surface 7 on boss 74 and the table structure 16 is substantially perpendicular to the armrest 12 to the position of maximum angular displacement in which the shoulder 84 is made to abut the stop surface 78 on the boss.

To return the table structure 16 to its stowed disposition in the armrest 12, table section 24 is folded into overlying relation with the table section 22 and the arm assembly pivoted about the pivot axis created by screw 60 to a vertical attitude. With the arm assembly so disposed, the limit boss 86 on the filler member 88 is positioned in the well recess 90 in the support surface 46 of the pivot block 40 whereupon any relative pivotal movement between the arm assembly 32 and the pivot block is prevented and the organization can be simply pivoted about the pivot bolt 44 into the compartment 14 formed on the interior of the armrest 12.

It should be further understood that, although a preferred embodiment of the invention has been illustrated and described herein, changes and modifications can be made in the described arrangement without departing from the scope of the appended claims.

I claim:

1. A stowable table system adapted for use in a vehicle seat or the like, including:
    a table structure;
    means forming a compartment in said seat for stowing said table structure;

a pivot block mounted for pivotal movement about a substantially horizontal axis in said compartment for moving said table structure between a stowed condition in said compartment and an exposed condition exteriorly thereof;

a table base for securing said table structure to said pivot block; and means for attaching said table base for pivotal movement with respect to said pivot block comprising:

a pivot stud having means at one end for pivotal connection with said table base and means at the other end for pivotal connection to said pivot block, whereby said table base is movable with respect to said pivot block about two angularly spaced pivot axes when said table structure is in its exposed condition; and mutually cooperable shoulder means fixedly positioned with respect to said pivot block and said table base, respectively, for limiting the angular displacement of said table base with respect to said pivot block when said table structure is in its exposed condition.

2. The stowable table system according to claim 1 including a pivot stud containing said pivot axle; and means for attaching said pivot stud to said table base for pivotal movement therebetween.

3. The stowable table system according to claim 2 wherein said shoulder means comprises a projection extending from the surface of said pivot block, and means forming a recess on said pivot stud for receiving said projection, said recess-forming means including angularly spaced shoulders cooperable with said projection to limit the angular displacement of said table base with respect to said pivot block.

4. The stowable table system according to claim 3 including limit stop means effective to prevent relative pivotal movement between said table base and said pivot block when said pivot block and said table base are aligned for stowing said table structure in said compartment.

5. The stowable table system according to claim 4 wherein said limit stop means comprises a projection extending from said table base and a recess in said pivot block, said recess being formed to permit only lateral translatory movement of said projection therein.

6. The stowable table system according to claim 2 in which the pivot axes for said pivot block, pivot stud and said table base are substantially mutually perpendicular.

7. The stowable table system according to claim 1 in which said table structure is movable fore-and-aft with respect to said table base.

8. The stowable table system according to claim 7 in which said table structure includes a pair of foldable table elements.

9. A stowable table system adapted for use in a vehicle seat, or the like, comprising:

a table structure;

escutcheon means in said seat having an elongated opening defining a compartment for stowing said table structure;

a pivot block mounted for pivotal movement to move said table structure between a stowed condition in said escutcheon and an exposed condition exteriorly thereof, said pivot block having a support surface adapted for substantially parallel disposition with respect to the surface of said escutcheon when said table structure is in its exposed condition;

a table base securing said table structure;

a pivot stud at one end pivotally mounting said table base and at the other end forming a pivot axle pivotally mounted about a vertical axis in said pivot block by being journalled in a hole extending transversely therethrough; and mutually cooperable shoulder means on said pivot block and said pivot stud for limiting the angular displacement of said table base with respect to said pivot block.

10. A stowable table system according to claim 9 wherein said shoulder means comprises a projection extending from said pivot block support surface; and means forming a recess o said pivot stud for receiving said projection, said recess-forming means including angularly spaced shoulders cooperable with said projection to restrict pivotal movement of said pivot stud with respect to said pivot block within angularly spaced limits.

11. The stowable table system according to claim 10 including limit stop means effective to prevent relative pivotal movement between said table base and said pivot block when said table base is aligned with said pivot block support surface for stowing said table structure in said compartment.

12. The stowable table system according to claim 11 wherein said limit stop means comprises a recess extending transversely of said pivot block support surface; and a projection extending from said table base and insertable in said recess to prevent relative angular movement between said table base and said pivot block when said table base is in the stowing position.

13. The stowable table system according to claim 9 in which said table structure is connected to said table base for fore-and-aft movement therebetween.

14. The stowable table system according to claim 13 in which said table structure includes a pair of foldable table elements.

15. The stowable table system according to claim 9 in which the pivot axes for said pivot block, pivot stud and said table base are substantially mutually perpendicular.

* * * * *